(12) United States Patent
Miller et al.

(10) Patent No.: US 7,983,297 B2
(45) Date of Patent: Jul. 19, 2011

(54) METHOD AND APPARATUS FOR THE EFFICIENT USE OF AVAILABLE COMMUNICATIONS NETWORK BANDWIDTH

(75) Inventors: Bruce D. Miller, North Reading, MA (US); Mark Sanders, Roanoke, VA (US)

(73) Assignee: Force 10 Networks, Inc., San Jose, CA (US)

( * ) Notice: Subject to any disclaimer, the term of this patent is extended or adjusted under 35 U.S.C. 154(b) by 59 days.

(21) Appl. No.: 12/366,820

(22) Filed: Feb. 6, 2009

(65) Prior Publication Data

US 2010/0202286 A1 Aug. 12, 2010

(51) Int. Cl.
*H04J 3/16* (2006.01)
*H04J 3/24* (2006.01)
*H04J 3/04* (2006.01)
*H04L 12/56* (2006.01)

(52) U.S. Cl. ........ 370/466; 370/401; 370/474; 370/477; 370/535

(58) Field of Classification Search .................. 370/401, 370/465–466, 412, 535–536, 474, 477
See application file for complete search history.

(56) References Cited

U.S. PATENT DOCUMENTS

| | | | | |
|---|---|---|---|---|
| 6,002,692 | A * | 12/1999 | Wills | 370/465 |
| 6,721,333 | B1 * | 4/2004 | Milton et al. | 370/469 |
| 6,795,506 | B1 * | 9/2004 | Zhang et al. | 375/240.26 |
| 7,257,131 | B2 * | 8/2007 | Smith | 370/466 |
| 7,386,008 | B2 * | 6/2008 | Jordan | 370/466 |
| 7,525,994 | B2 * | 4/2009 | Scholte | 370/474 |
| 2004/0190548 | A1 * | 9/2004 | Harel et al. | 370/466 |
| 2006/0018336 | A1 * | 1/2006 | Sutivong et al. | 370/437 |
| 2007/0041385 | A1 * | 2/2007 | Sali et al. | 370/395.21 |
| 2007/0195815 | A1 * | 8/2007 | Turner et al. | 370/465 |

* cited by examiner

*Primary Examiner* — Kwang B Yao
*Assistant Examiner* — Candal Elpenord
(74) *Attorney, Agent, or Firm* — Robert Schuler (57) ABSTRACT

A communications network gateway receives a stream of information formatted to be compatible with a first sub-network and it receives a stream of information formatted to be compatible with a second sub-network. The frames in the second stream are extracted and modified to be compatible with the transmission format of the first sub-network. The two streams of information are then aggregated for transmission over a logical network link in a manner that optimizes the bandwidth utilization of the overall communications network.

10 Claims, 7 Drawing Sheets

WIRELESS COMMUNICATION NETWORK 10

METHOD AND APPARATUS FOR THE EFFICIENT USE OF AVAILABLE COMMUNICATIONS NETWORK BANDWIDTH

FIELD OF INVENTION

The invention relates generally to the area of communication networks and specifically to arrangements for efficiently utilizing the available network bandwidth.

BACKGROUND OF INVENTION

Communications network congestion can often cause applications, requiring a specified quality of service, to perform poorly. Information flows generated by voice or video applications typically need to be propagated through the network on a priority basis over data applications to satisfy the requirements of these applications. Delayed delivery or the uneven jittery) delivery of voice or video information can have a negative impact upon the performance of the application and can have a consequent impact upon the quality of the experience for the user of the application.

Network congestion can be alleviated by strategically adding additional hi-speed (T1) lines to a network so that there is sufficient network bandwidth at all times, especially during times of peek traffic. However, continuing to add additional hi-speed lines can be expensive. Another known prior art technique for alleviating network congestion is the application of network management policies (policing) that operate to reserve different amounts of network bandwidth for flows of different priority. In the event that the communication network includes multiple physical signal paths of varying bandwidths, management policies can be implemented that dedicate priority traffic to the signal paths with the most bandwidth or the least amount of end-to-end delay, and in the event that one signal path becomes congested, the network traffic can be redistributed to another path to relieve the congestion. Other methods for relieving network congestion rely on delaying [temporal delay] lower priority traffic for transmission over the network until such later time that the network congestion clears up. Still other methods for relieving network congestion rely on stripping certain control information from packets at an origin location and then recreating the control information at the point that the packet arrives at a destination location or at an intermediate location where the information is needed to route the packet. Network congestion can also be relieved by dynamically assigning flows onto one or more physical or logical signal lines, thus freeing up bandwidth on other signal lines for other flows during times of peak traffic. Dynamically redistributing network flows is a practical solution in the event that all or most of the traffic is able to be processed by the infrastructure devices in the traffic path. However, in the event that the network is handling traffic using different technologies and/or protocols, dynamic redistribution can be problematical or not possible.

Many mobile cellular networks employ the standards based CDMA 2000 operating specification, or derivatives thereof, to implement packet based data communication services with the capability to send voice, video, data and signaling information between mobile communication devices and radio network controllers. One early CDMA2000 based data communications scheme was 1RTT. 1RTT was developed primarily to transmit digital voice and signaling information over a duplex pair of 1.25 MHz radio channels. Mobile communication devices and communications network infrastructure was designed specifically to generate and transmit the 1RTT traffic over the network. As other applications with higher data rates, requiring higher network bandwidth were added to mobile communication devices, it became necessary to develop data communication schemes with the ability to handle the higher data rates. EVDO (Evolution Data Optimized), LTE (Long Term Evolution) and WiMax were developed in response to these new, higher data rate, bandwidth intensive applications being used. In addition to developing the newer data communication schemes, new network infrastructure, such as routers, gateways, etc., were utilized to manage the transmission of the data through the high-speed data communication networks.

Figure 1A:
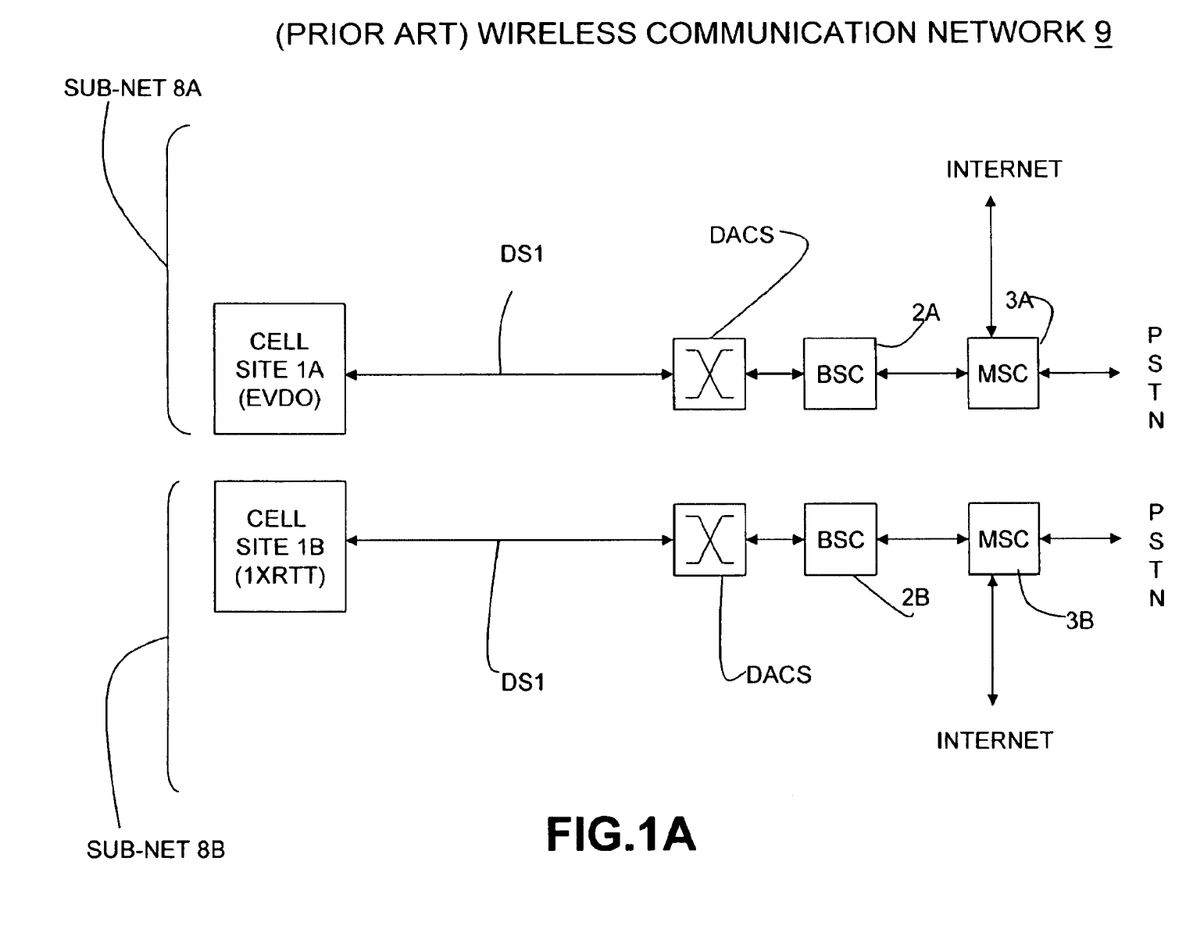
FIG. 1A is a hi-level functional block diagram of a prior art wireless network.

Among other things the frame sizes, frame duration, data rate and channel parameters between the 1RTT and EVDO implementations of CDMA2000 are different. While the 1RTT network infrastructure devices were designed to process frames or packets of information in a variety of different formats, such as frame relay, HDLC and IP, the newer infrastructure devices, designed to process the newer, high-speed data communication schemes like EVDO are typically not configured to process the older, legacy data forms like frame relay and HDLC. As a consequence, wireless service providers typically maintain two or more separate wireless networks, a legacy network dedicated to transmitting the 1RTT traffic and another network which can be dedicated to transmitting the EVDO traffic. Such a prior art dedicated network infrastructure architecture is shown in FIG. 1A. So, in the event that a network transmitting frame relay or HDLC traffic becomes congested, one prior art solution is to add additional hi-speed lines and additional infrastructure, but the addition of such infrastructure is expensive. Another solution is to remove, transmit and then regenerate certain control information associated with the frame/packets of information. While this method does lower the bandwidth requirement needed to transmit the traffic, it increases the latency in the traffic flow due to processing the control information for removal and re-insertion. Yet another solution is to encapsulate the frame relay or HDLC traffic utilizing the Layer 2 Tunneling Protocol (L2TP). While encapsulating frame relay and HDLC traffic using the L2TP does permit the reassignment of the traffic for transmission over another network, the frame sizes of the legacy frames tend to be small and L2TP increases the size of the encapsulated frame from twenty-five to fifty percent. Such a large increase in frame size may defeat the purpose of reassigning the traffic to another network as it can result in congestion in the other network. In any event, it is not practical to dynamically reassign the older legacy formatted frames of information from a 1RTT based network to an EVDO based network, even in the event that there is available, unused bandwidth on the EVDO based network.

Therefore, in order to efficiently utilize available network bandwidth and to avoid having to add additional hi-speed lines or have to strip and then regenerate certain control information from packets as they move through the network, we discovered that it was possible to modify the legacy frame relay and HDLC frames of information so that they can be aggregated with otherwise incompatible traffic for efficient transmission over an EVDO or other hi-speed IP based network.

SUMMARY

A method for efficiently utilizing communications network bandwidth is realized in a network gateway that receives a stream of information formatted for transmission over a first sub-network of the network and receives a stream of information only formatted for transmission over a second sub-network of the network. The network gateway then terminates the stream of information formatted for transmission over the first sub-network to form a stream of terminated frames and terminates the stream of information formatted for transmission over the second sub-network by extracting only header and payload information from the formatted information to form a stream of extracted frames. Subsequently, the network gateway modifies the stream of extracted frames so that they can be transmitted over a logical link over the network and then statistically aggregating the stream of terminated frames with the modified stream of extracted frames to form a statistically aggregated stream of frames. Finally, the network gateway transmits the statistically aggregated stream of frames over the logical link from the first network gateway to a second network gateway in a manner that optimizes the use of the available bandwidth in the network.

DETAILED DESCRIPTION

Wireless communication service providers operate a number of CDMA (code division multiple access) based networks across the world and these networks can support a number of potentially co-resident technologies such as 1RTT, EVDO, LTE and WiMax, to name a few. CDMA networks typically employ dedicated DS1/T1 facilities per technology between the mobile communications device or radio and the radio network controller (RNC).

Figure 1B:
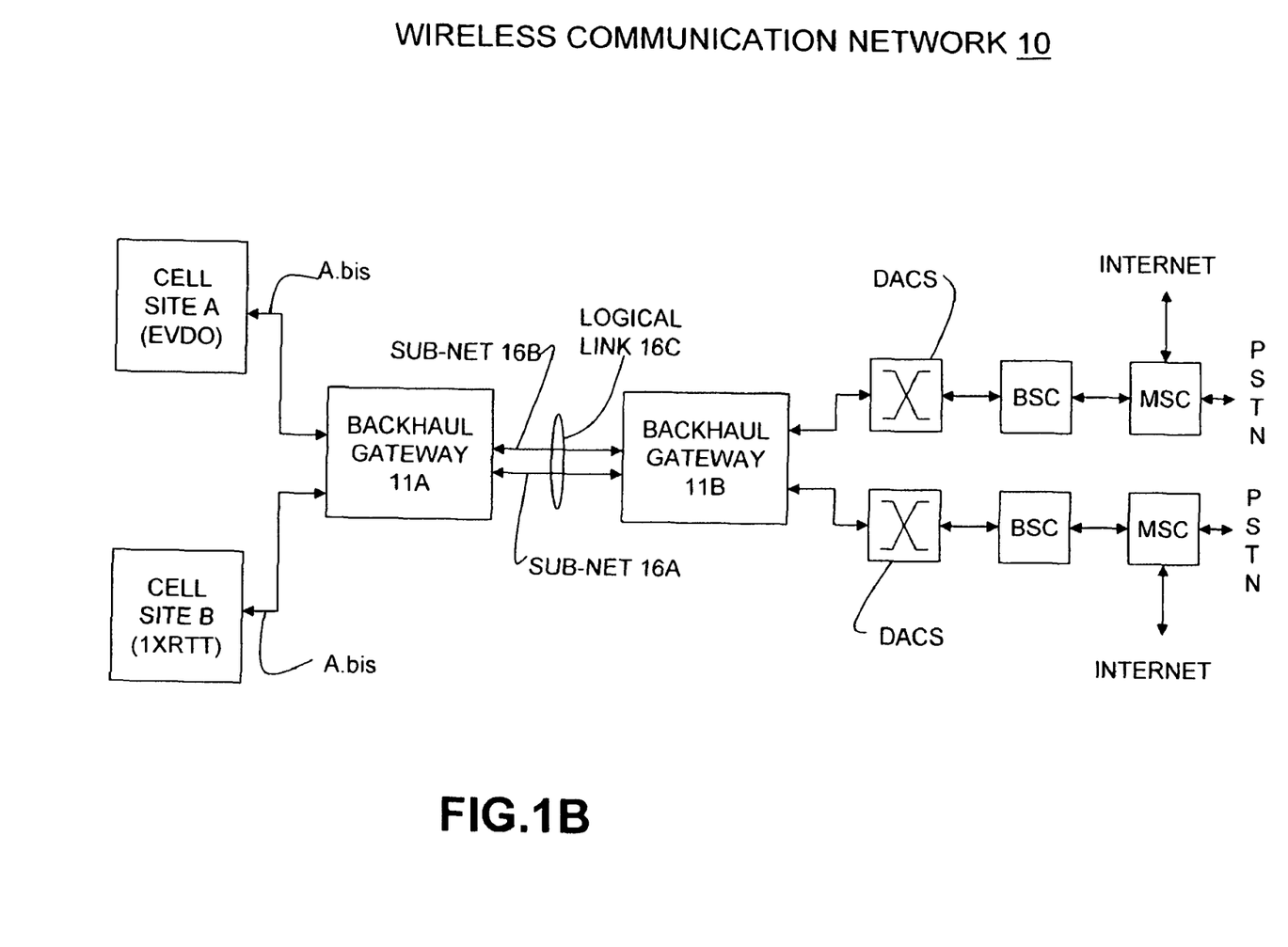
FIG. 1B is a hi-level function block diagram of a wireless network according to an embodiment of the invention.

The fundamental issue with classic backhaul networks is that they do not provide optimized use of bandwidth. As shown in FIG. 1A, different infrastructure in wireless communication network 9 is assigned to each technology. Each of the different infrastructures is referred to in FIG. 1A as a sub-net. Sub-net 8A represents infrastructure that is dedicated to supporting the transmission of EDVO based traffic from cell site 1A and sub-net 8B represents infrastructure that is dedicated to supporting the transmission of 1RTT based traffic from cell site 1B. Each of the EDVO and 1RTT traffic flows are transmitted from cell sites 1A and 1B through digital cross-connect switches (DACS) to the Base Station Controllers (BSC) 2A and 2B respectively. The flows are then directed from BSC 2A and 2B to respective Mobile Switching Centers (MSC) 3A and 3B, where the flows are directed to the PSTN or Internet depending on whether the traffic is voice or data. As each sub-network 8A and 8B includes infrastructure that is designed to process traffic formatted differently, such as frame relay, HDLC, and IP, there is no potential for reuse between the sub-nets 8A and 8B without moving to a shared resource network topology. In a shared resource network as illustrated in FIG. 1B, the L2TP format can be used to encapsulate the frame relay and HDLC traffic for transmission over a shared network. However, L2TP encapsulation increases the size of the frame relay or HDLC frames by twenty-five to fifty percent, which not only unnecessarily squanders network bandwidth, but can also have the effect of creating congestion in the sub-net the encapsulated traffic is assigned to. As such, when the volume of frame relay or HDLC traffic increases in the 1RTT sub-net 8B to the point that sub-net 8B becomes congested, there is no practical technique for transferring or assigning some portion of the frame relay or HDLC flow to sub-net 8A, even in the event that sub-net 8A is not at capacity. In this case, the wireless communication network 9 is not being utilized efficiently and bandwidth can be left unused/stranded. Given such a communications network architecture and operation, it may become necessary for the mobile service provider to consider sizing the separate backhaul sub-nets 8A and 8B for the peak traffic demands for each the EDVO and 1RTT flows. The costs associated with adding and maintaining additional backhaul bandwidth (more T1 lines, gateways, routers, etc.) represents the single largest contribution to mobile carrier operating costs, as such, there is a strong financial motivation to optimize the assignment of flows to fully utilize the existing capacities of all of the sub-nets being maintained.

A more pragmatic approach to achieve network efficiencies is to use the backhaul sub-nets 8A and 8B of FIG. 1A as a shared resource or single logical link 16C for the transport of both the 1RTT and the EBDO traffic as illustrated in FIG. 1B. There are a number of advantages associated with managing the backhaul subnets 16A and 16B of FIG. 1B as a single, logical link 16C (link 16C can be composed of X number of physical links such as T1 lines); namely, the separate backhaul sub-nets 16A and 16B can be sized for overall traffic demands independent of the different CDMA2000 implementations employed in the network 10. As customers, move from one implementation of CDMA2000 to another (1RTT to EDVO), the mobile service provider only needs to consider the sizing of a single logical grouping of sub-nets as opposed to the sizing for each of the backhaul sub-nets 8A and 8B. Further, overall communication network 10 efficiencies can be achieved by statistically aggregating the flows from each of the two sub-nets 8A and 8B into a single flow for transport over a single, logical sub-net and by properly prioritizing voice services over data services. Typically, data services can be oversubscribed by as much as 10:1 in wireless communication networks, such as network 10, without the network having any actual congestion issues. It should be noted that the transmission control protocol/internet protocol (TCP/IP) is designed to aggressively utilize available bandwidth, so statistical aggregation is an effective mechanism for limiting overall consumption of bandwidth. And finally, the overall attributes (latency, jitter, packet loss, etc.) of the backhaul portion of network 10 can be designed to meet the service needs of voice, video and data without having to design to the most rigorous service. Voice services in the mobile infrastructure are quite sensitive to latency and jitter. They tend to be moderately loss sensitive. Video services are not particularly sensitive to latency and jitter (depending upon the depth of the output jitter buffers), but video services can be extremely sensitive to loss. Data services are typically not very sensitive to latency, jitter or loss (providing they are transported with a reliable protocol such as TCP/IP).

Continuing to refer to FIG. 1B, a "converged" wireless communication network 10 is shown that is generally the same as the network described with reference to FIG. 1A, with the exception that there are only two backhaul gateways 11A and 11B. Also shown in FIG. 1B is a single logical link 16C which is comprised of the two sub-nets 16A and 16B of FIG. 1A and which provides a communication link between the two gateways 11A and 11B. Each of the sub-nets 16A and 16B can support two or more physical DS1/T1 lines. In the network architecture of FIG. 1B, the wireless service provider need only consider the aggregate bandwidth demands of the network 10 without consideration to the different implementations of CDMA200. It is important to recognize that traffic must be classified according to voice, video, data, etc, and quality of service must support the requirements of the individual traffic types. Accordingly, voice traffic must be marked with the highest priority. Voice traffic must be scheduled as a committed information rate service with minimized latency. As such, voice traffic should be scheduled strictly as "prioritized traffic" over the other traffic types. Video traffic is likely one of the most bandwidth consumptive services provided in the mobile infrastructure. Due to the high compression ratios (MPEG2/MPEG4), packet loss can create significant disruption and should be minimized for a high quality user experience. And finally, data traffic is generally web browsing etc. . . . It is typically protected with a reliable transport protocol such as TCP/IP and packet loss is generally expected. In addition, the data traffic is not sensitive to latency variations and jitter variations and so this traffic should be scheduled with a lower priority than Video Traffic.

According to the preferred embodiment of the invention, the novel aspects of a backhaul network implementation are incorporated into each of the backhaul gateways 11A and 11B that are shown in FIG. 1B. Gateway 11A modifies the legacy frame relay and/or HDLC frames received from cell site B, in this case, using a novel, modified frame format and then statistically aggregates (according to the relative priorities of the flows and any weighting factor on the flow such that any one flow may only occupy a certain percentage of the bandwidth when the link reaches congestion) the traffic received from cell site A and cell site B for transmission over the logical link 16C according to the quality of service requirement of each packet. Further, and according to another embodiment of the invention, congestion can be further mitigated by temporally spreading or delaying the transmission time of some or all of the lower priority packets over the backhaul portion of network 10. In contrast to the L2TP encapsulation technique, which expands a legacy frame relay or HDLC frame by at least twenty-five percent, the novel encapsulation method of the invention expands a legacy frame no more than six percent. Minimization of the frame expansion is a critical aspect of the invention.

Typical frame relay frames include sixteen bytes of information. The number of bytes is limited by the requirement that no more than eight bytes of data be included in each frame, so the degree to which each frame is expanded beyond sixteen bytes will have a corresponding affect on the frequency with which legacy frames can be transmitted. By contrast, Ethernet packet payloads can range in size up to 1522 bytes for standard Ethernet frames, so the addition of extra bytes for encapsulation does not appreciably affect the relative size of the packet. A detailed description of the novel encapsulation format is described later in more detail with reference to FIG. 3 and FIG. 4. The aggregation of the traffic from cell sites A and B is "statistical" in nature. Statistical in this context means that the communications channel (logical link 16c) is divided into an arbitrary number of traffic flows over which packets are delivered asynchronously. Such statistical aggregation methods are well know to those skilled in the operation of wireless communications networks and so will not be described here further.

Figure 2:
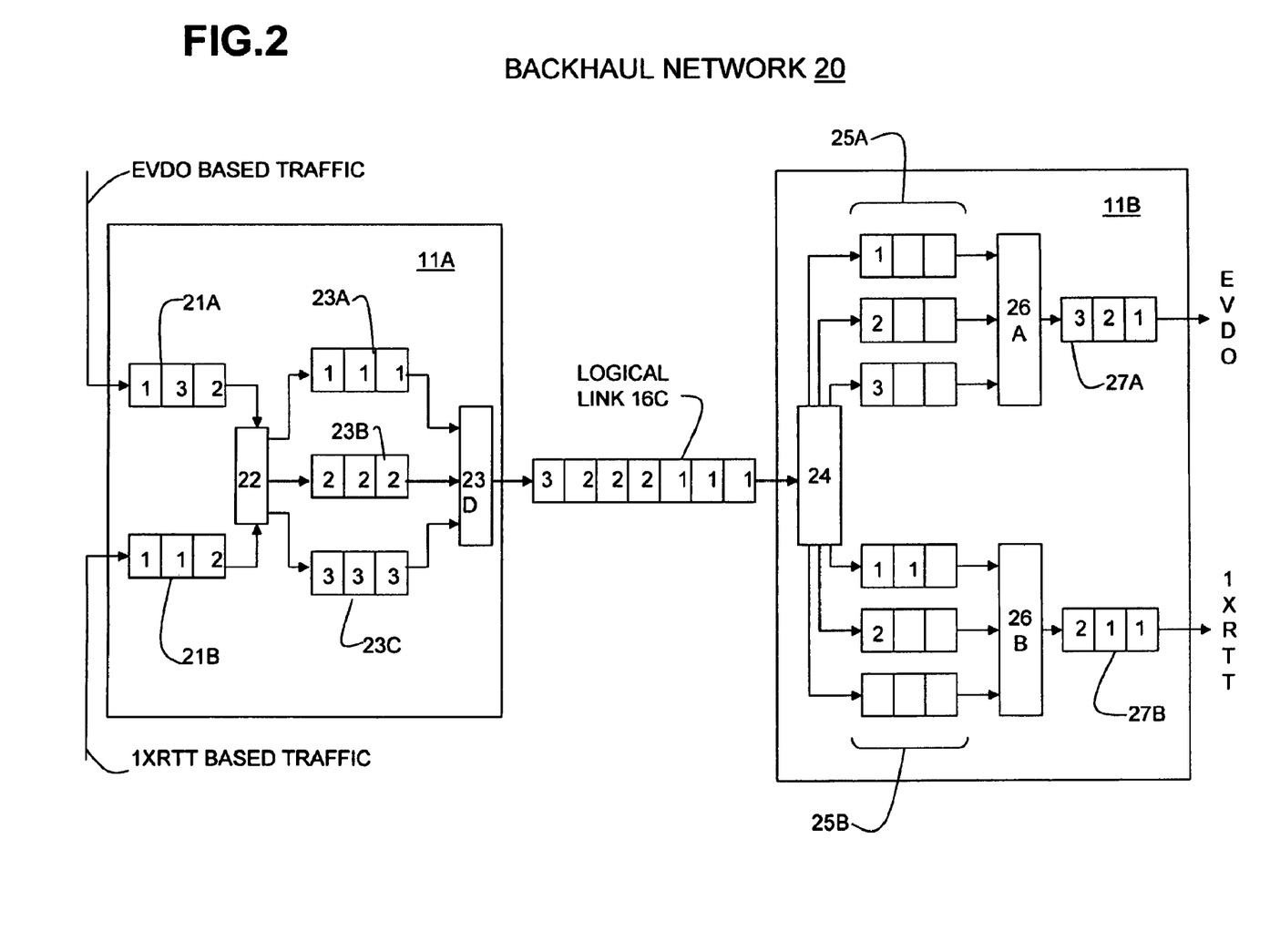
FIG. 2 is a functional block diagram of a backhaul network showing two gateways and connecting links.

FIG. 2 is a diagram illustrating the functional blocks that can be employed to implement the preferred embodiment of the novel backhaul network 20. Backhaul gateways 11A and 11B correspond to the two gateways illustrated in FIG. 1B and logical link 16C corresponds to the logical link 16C in FIG. 1B. Backhaul gateway 11A is comprised of first and second input queues labeled 21A and 21B respectively. The first input queue 21A receives EVDO based traffic from, in this case, cell site A (not shown) and the second input queue 21B receives 1RTT based traffic from, in this case, cell site B. Each of the packets or frames of information that are stored in the first and second queues include information about the priority with which they should be transmitted over the backhaul network 20. The priority of each frame or packet stored in the input queues 21A and 21B is represented by the priority numbers "1" for voice, "2" for video and "3" for data, for instance. The priority "1" represents the highest priority (voice) and "3" represents the lowest priority (data). Each number, "1" to "3" represents a single packet or frame of information that is temporarily stored in the first and second queues waiting to be processed by a frame termination/modification module 22, hereinafter referred to as the frame modification module 22. Among other things, the frame modification module 22 implements well known techniques for identifying the priority level of each packet or frame of information that is stored in either of the two queues 21A and 21B and well know techniques for identifying the traffic type (1RTT or EVDO).

Continuing to refer to FIG. 2, in the event that the traffic is identified as EVDO based by frame modification module 22, then the EVDO traffic is terminated by the removal of certain control information, which can include fields used to encapsulate the information contained in the IP packet, and the packet is stored as an unmodified packet or frame, according to its priority, in one of the three input queues 23A, 23B and 23C. On the other hand, in the event that the traffic is identified as 1RTT based, then the frame modification module 22 further determines how the 1RTT based information is formatted (frame relay, HDLC, IP). In the event that the traffic is formatted according to the internet protocol, these packets are terminated by the removal of certain control information and are passed to one of the three priority queues 23A, 23B or 23C. If, on the other hand, the traffic is determined by the frame modification block 22 to be in the frame relay or HDLC format, then module 22 includes functionality to extract certain information from these frames as will be described later with reference to FIGS. 3 and 4. After the frame modification module 22 modifies the frames, they are queued in the three priority queues according to the priority information included in each frame. On the other hand, in the event that frame modification module 22 is unable to identify the priority of either or both of the frame relay and HDLC frames, these frames can be placed into the highest available priority queue which in this case can be the queue labeled 23A.

With continued reference to FIG. 2, as the unmodified and modified frames arrive at and are stored in the three input queues 23A, 23B and 23C, they become available to an encapsulation and aggregation function 23D, hereinafter referred to as the link interface 23D, which at each point in time operates according to quality of service requirements to de-queue all of the highest priority packets of information stored in queue. In operation, the link interface 23D first de-queues the available packets of information stored in queues 23A, 23B and 23C according to the priority associated with each packet. During the de-queuing process the link interface 23D also operates to add a compressed IP header to all frame relay and HDLC frames and to encapsulate the resulting frame relay and HDLC frames in the well known PPPMux format, which effectively concatenates multiple frames into a single PPP frame. Subsequent to the PPPMux framing process, the PPPMux frames are statistically aggregated according to the priority of each PPPMux frame, to form packets delivered to MLPPP functionality, also included in the link interface 23D, for transmission over the logical link 16C.

Continuing to refer to FIG. 2, and in an alternative embodiment of the invention, in addition to the frame modification, encapsulation and aggregation techniques described previously, the transmission of lower priority traffic, such as the frames or packets labeled as "2" or "3", over the backhaul network 20 can be shifted in time or temporally smoothed which allows the backhaul network 20 to be more efficiently utilized during times of peek network traffic. Generally, the novel process of modifying incoming legacy frame relay and HDLC frames and then encapsulating these legacy frames so that they can aggregated for transmission over the backhaul infrastructure dedicated to EVDO traffic adds no more than six percent to the size of the original, unmodified legacy frame. However, such modification and encapsulation of these legacy frames allows the wireless communications network 10 to aggregate and then transport both the EVDO and 1RTT traffic over any backhaul infrastructure that is capable of processing IP traffic or any other standard information format. This method enables the network 10 to optimize the flow of traffic over the backhaul network 20 to better utilize the available bandwidth in the physical links that comprise the single logical link 16C of the backhaul network 20.

Again referring to FIG. 2, the MLPPP frames are transmitted over the logical link 16C and arrive at the gateway 11B where the MLPPP frames are terminated at functional block 24 where the MLPPP headers are removed, the PPPMux frames are decomposed and the headers are removed and the frame relay and HDLC frames are restored to their original format. After the MLPPP frames are terminated at functional block 24, the EVDO IP packets are queued in the set of three queues, represented in FIG. 2 as queues 25A, according to the priority of each packet, and the modified frame relay and HDLC frames are queued in the set of queues 25B according to their priority. Functional blocks 26A and 26B operate to dequeue the packets or frames stored in the two sets of queueus 25A and 25B into one or more EVDO flows and one or more 1RTT flows that are transported to a base station controller. Although FIG. 2 only describes the flow of information in one direction (cell site to BSC) through the backhaul network 20, it should be understood that flow of information is bi-directional and also flows from the BSC to the cell sites.

Figure 3:
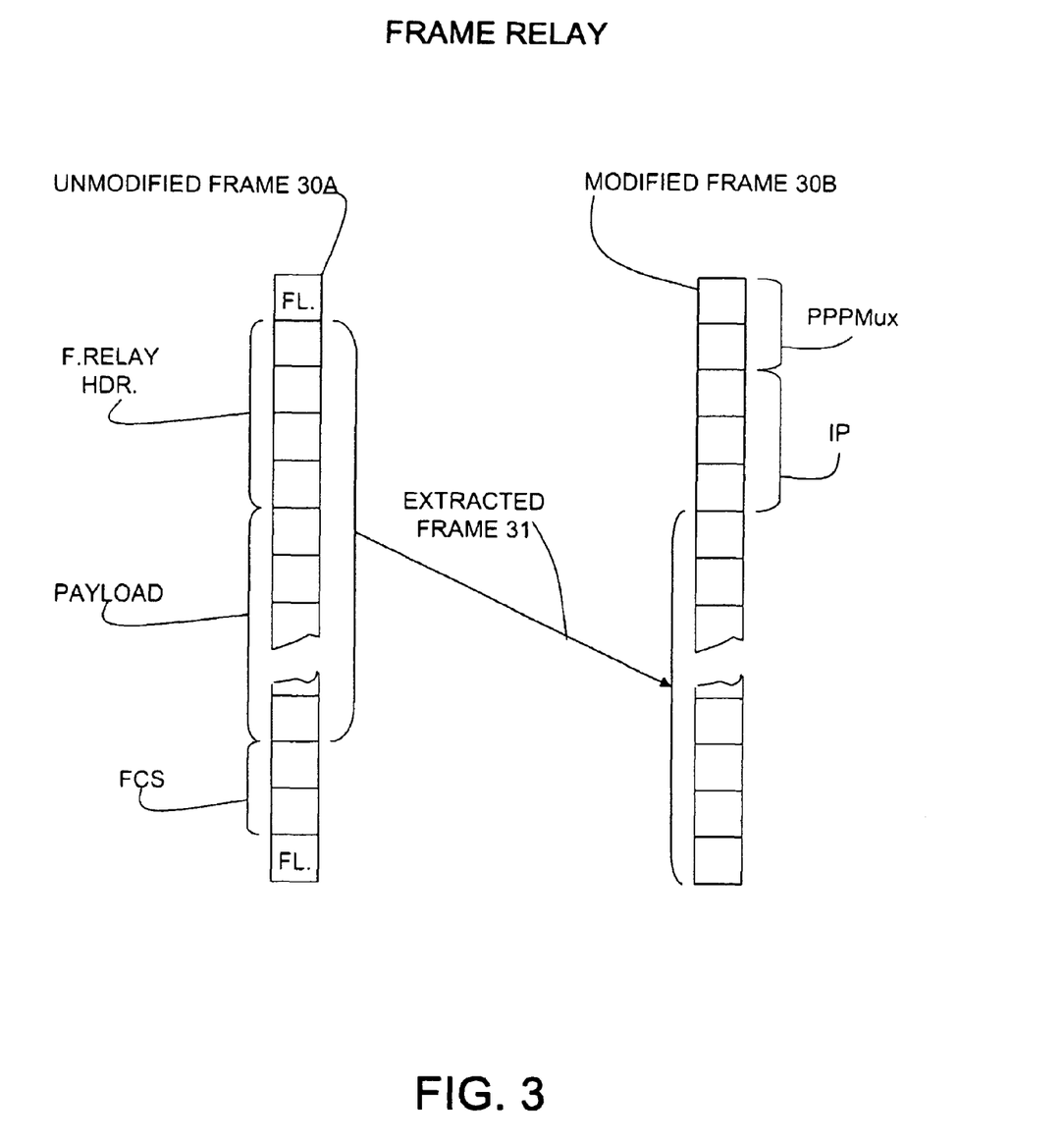
FIG. 3 is a diagram showing the format of an encapsulated frame relay frame.

The preferred frame modification method of the invention will now be described with reference to FIG. 3 in the context of a frame relay format. An unmodified frame 30A in the frame relay format can include sixteen bytes of information. The frame format can include two frame delimiter bytes (a start delimiter flag byte and an end delimiter flag byte), four bytes of header information, two bytes of frame check sequence (FCS) information and eight bytes of data or payload information. In order to form a modified frame relay frame 30B according to the preferred embodiment, the two delimiting flag bytes are stripped and the two bytes of FCS information are stripped by the frame modification module 22 of FIG. 2. The removal of these four bytes results in an extracted frame relay frame 31 consisting of twelve bytes of which four bytes include frame relay header information and eight bytes of payload information. In order to form the modified frame 30B, the compressed UDP/IP (cUDP) header bytes are added which serve to encapsulate the extracted frame 31 as an IP packet so that it can be transmitted over the logical link 16C of FIG. 2. Another two bytes of PPPMux header information is added to the front of the encapsulated extracted frame 31 to complete the formation of the modified frame relay frame 30B. As previously mentioned with reference to FIG. 2, the method of modification of a frame relay frame according to the invention only expands the original frame size by as much as six percent. This frame modification format allows the wireless network 10 to transmit the frame relay traffic over the logical link 16C in an optimal manner from the perspective of network bandwidth usage. More specifically with respect to the modified frame 30B, the PPPMux encapsulation bytes include one byte on PPP frame length information and one byte of protocol information (which is optional). The protocol employed in this case is IP but the legacy frames can encapsulated in any standards based communication protocol. The three bytes of IP header information actually represents twenty bytes of IP header and eight bytes of UPD header information that is compressed into three the bytes of compressed UDP (user dategram protocol) information. Both the PPPMux encapsulation (RFC 3153) and the compressed UDP header formats (RFC 2507) are well known to wireless network engineers. Once the frame is modified it is available to be statistically aggregated in the MLPPP format and transmitted over the logical link 16C of FIG. 2. The link interface 23D is implemented to observe the quality of service requirements of each of the flows.

In essence, the encapsulation of the frame relay and HDLC frames allows the physical links between the gateways 11A and 11B to be managed as a single logical IP link/wire, such as the logical link 16C of FIG. 2, for transporting the HDLC and/or Frame Relay frames in the same backhaul facilities as the EVDO based traffic. The quality of service model insures that loss sensitive or latency sensitive traffic receives priority treatment over less critical traffic. The backhaul network 20 of FIG. 2 becomes a composite transport infrastructure, referred to here as the logical link 16C, for the multiplicity of protocols from the various radios and technologies. By doing this, significant optimization can occur. The facilities can be sized on aggregate for voice capacity and data transport will be handled on an availability basis (delayed in time) when higher priority traffic is not present (voice, control). In general, statistical gains can be on the order of 30% to 50% based upon analysis of live traffic. In addition, since lower priority traffic can be temporally smoothed, it can be handled somewhat shifted in time and that allows the backhaul facility to be more efficiently utilized.

Figure 4:
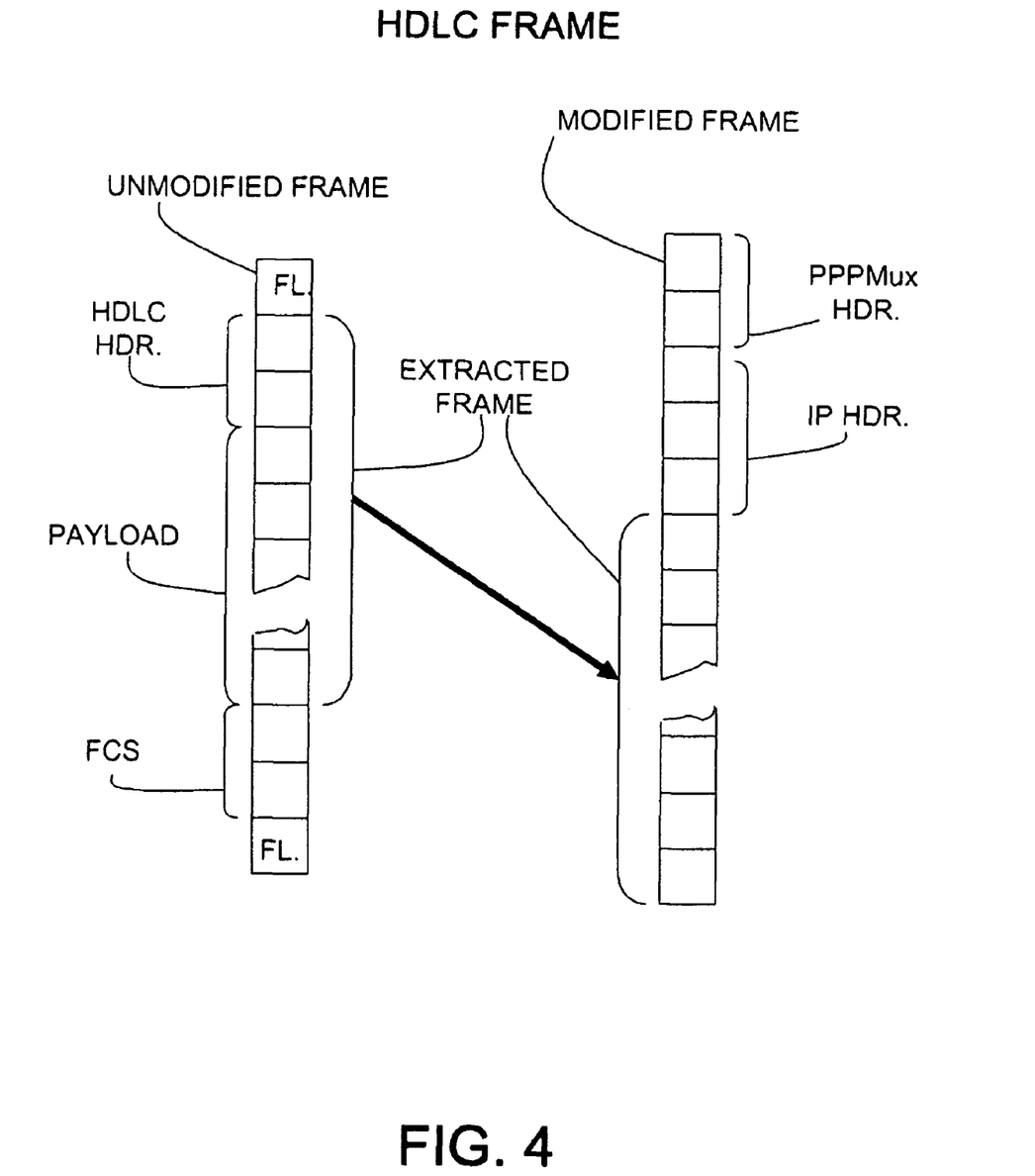
FIG. 4 is a diagram showing the format of an encapsulated HDLC frame.

The schema for modifying an HDLC frame is shown with reference to FIG. 4 Specifically with reference to FIG. 4, an unmodified HDLC frame 41A can include two delimiting flag bytes, two bytes of HDLC header (LAPD) information, N bytes of payload information, and two bytes of FCS information which is information used to perform a cyclic redundancy check. According to the preferred embodiment of the invention, the two delimiting flag bytes and the two FCS bytes are removed from the frame by the link interface 23D of FIG. 2 to produce an extracted frame. The link interface 23D of FIG. 2 operates on the extracted frame to encapsulate it with IP header information, which in this case includes the addition of twenty eight bytes of IP header information which is in turn transformed by the encapsulation and aggregation function 23 into the three bytes of IP header information in the compressed UDP format. The encapsulation and aggregation function 23 then encapsulates the packet by adding two bytes of PPPMux header information to form a modified HDLC frame and the modified HDLC frame is then ready to be statistically aggregated with other frames and transmitted over the backhaul network 20.

Figure 5A:
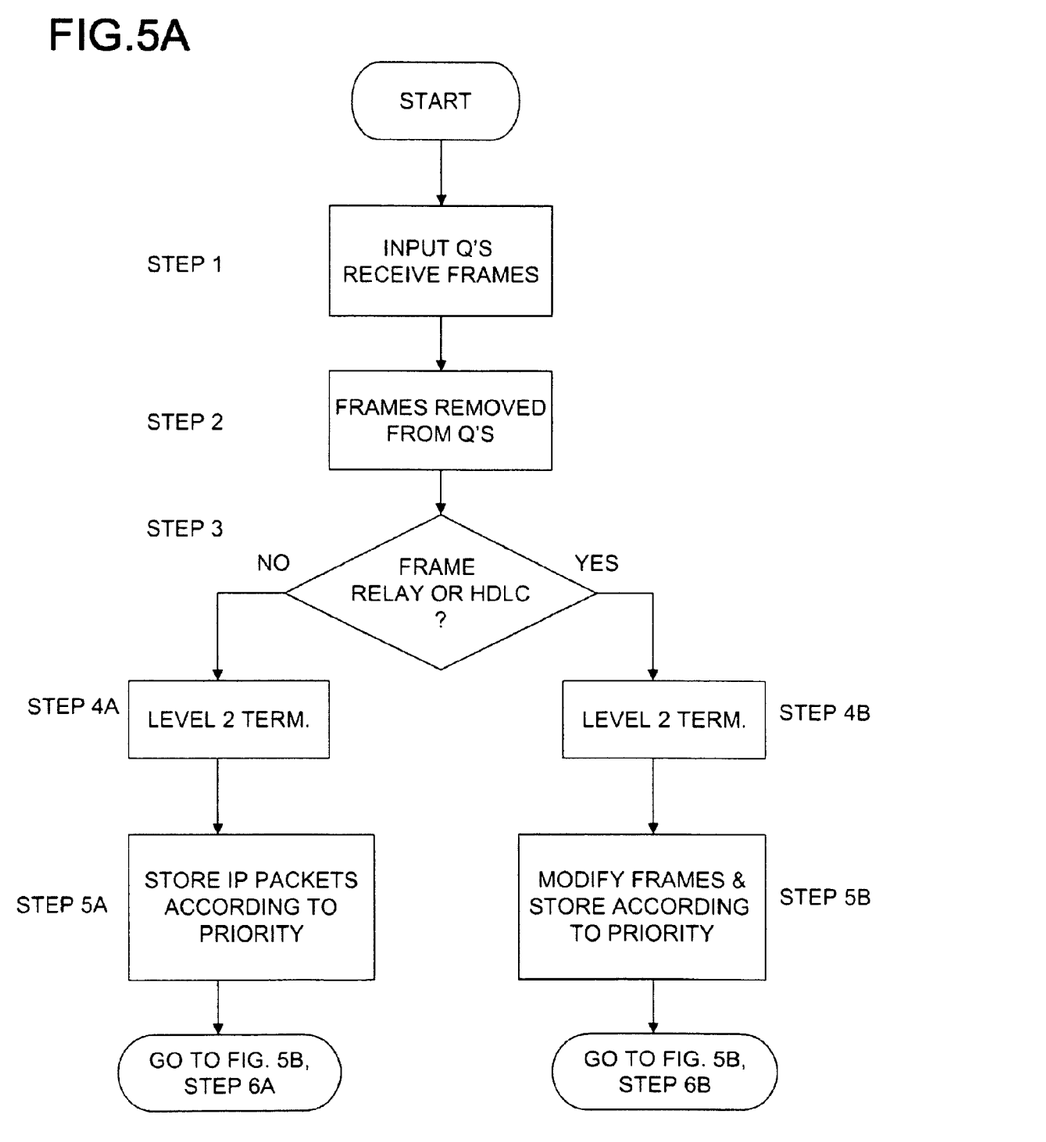
FIG. 5A and FIG. 5B is a logic flow diagram describing the novel legacy frame encapsulation and aggregation method.
Figure 5B:
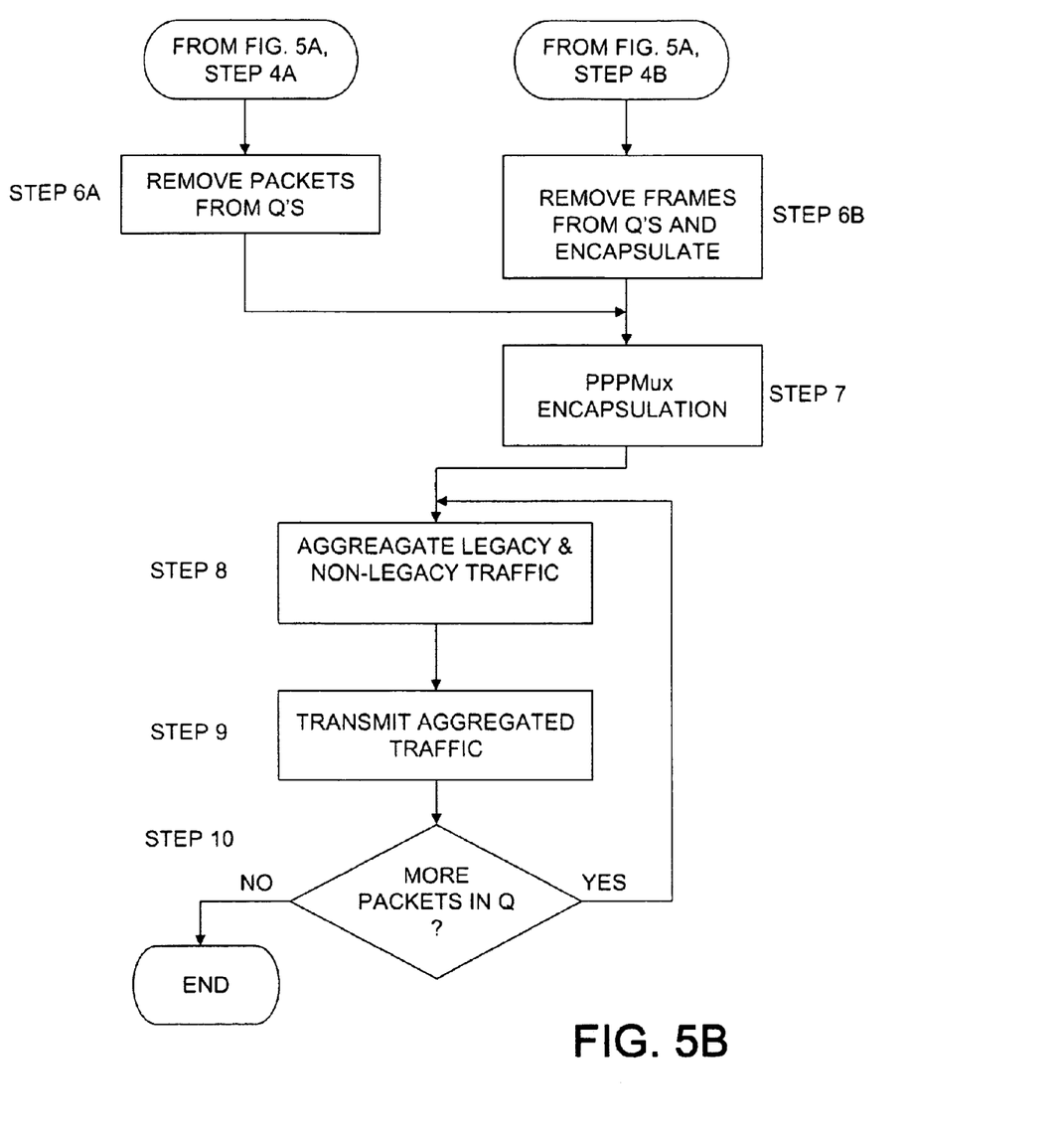

FIGS. 5A and 5B together represent a logical flow diagram of the method for modifying and encapsulating legacy frames and managing the statistical aggregation of these modified frames for transmission with the modified frames over a logical backhaul network link. It should be understood that although the method of the invention is described in the context of a backhaul network that supports statistically aggregated traffic formatted according to the internet protocol, the method of the invention can be implemented in a network that supports a plurality of protocol that are standards based and/or proprietary. In step 1, EVDO packet and 1RTT frames arrive at the two input queues 21A and 21B respectively over links that operate according to the well known IP Control Protocol (IPCP) or Bridge Control Protocol (BCP) and are stored temporarily before being processed. In step 2, the frame modification module 22 de-queues the packets and frames from both of the queues 21A and 21B and in step 3 identifies which of the packets or frames are legacy traffic or not. If the packets are not associated with legacy traffic, then the process proceeds to step 4A, otherwise the process proceeds to step 4B. In step 4A the non-legacy packets or IP based traffic (EVDO and 1RTT that is formatted according the IP) are terminated at layer two, which is the link layer as specified in the TCP/IP reference model. Terminating the traffic at layer two involves the removal of PPPMux/MLPPP formatting and expansion of the cUDP header information. After the IP packets are terminated, in step 5A they are stored as frames or data grams, according to their priority, in the corresponding queues 22A, 22B and/or 22C for further processing. In the event that the traffic is legacy based, then in step 4B the information associated with IPCP or BCP protocols is removed and in step 5B the legacy frames are modified, as described earlier with reference to FIG. 3 and FIG. 4, which results in the generation of an extracted frame. This extracted frame is then stored in the appropriate queue 22A, 22B and/or 22C along with the non-legacy or unmodified frames.

Referring now to FIG. 5B, which is a continuation of the process described with reference to FIG. 5A, in step 6A, the non-legacy frames are removed from the three queues 22A, 22B and 22C according to the priority associated with each frame and in step 6B the extracted legacy frames are removed from the three queues and encapsulated according to the novel format described with earlier reference to FIG. 3 and FIG. 4. As many as five bytes are added to the legacy frames during the encapsulation process. It should be understood that steps 4A & 4B to 6A & 6B occur essentially in parallel. In step 7, the non-legacy traffic and the legacy traffic are encapsulated using a format such as PPPMux, for example. Each PPPMux frame includes a plurality of legacy or non-legacy frames some of which can be of different priority levels. Then in step 8, the encapsulated legacy and non-legacy PPPMux frames or super frames, as they can be referred to, are statistically aggregated to form a MLPPP packet for transmission over the logical link 16C to the far end of the backhaul network 20. In step 10, if there are more packets to transmit the process returns to step 8, otherwise the process halts. The process of sending MLPPP packets is asynchronous and occurs when packets are available to transmit. When packets are not available to transmit, the transmission network is idle (in the case of TDM connections this consists of sending IDLE patterns down then transmission line).

The forgoing description, for purposes of explanation, used specific nomenclature to provide a thorough understanding of the invention. However, it will be apparent to one skilled in the art that specific details are not required in order to practice the invention. Thus, the forgoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

We claim:

1. A method for optimizing network bandwidth utilization, comprising:
receiving at a network gateway a stream of information formatted for transmission over a first sub-network of the network and receiving a stream of information only formatted for transmission over a second sub-network of the network;
terminating the stream of information formatted for transmission over the first sub-network to form a stream of terminated frames and terminating the stream of information formatted for transmission over the second sub-network by extracting only header and payload information from the formatted information to form a stream of extracted frames;
modifying the stream of extracted frames by adding a condensed IP header to each of the extracted frames to create an IP packet and encapsulating the IP packet in a point-to-point protocol multiplex format to form a point-to-point protocol frame;
statistically aggregating the stream of terminated frames with the modified stream of extracted frames to form a statistically aggregated stream of frames; and
transmitting the statistically aggregated stream of frames over the logical link from the first network gateway to a second network gateway in a manner that optimizes the use of the available bandwidth in the network.

2. The method of claim 1 further comprising selecting at least one higher priority frame over a lower priority frame for aggregation and transmission over the logical link from the first network gateway to a second network gateway.

3. The method of claim 1 wherein the network is a backhaul network that supports CDMA based traffic.

4. The method of claim 1 wherein the formatted information included in the first stream is terminated at layer two as defined by the OSI reference model.

5. The method of claim 1 wherein the formatted information in the second stream is terminated by extracting the header and the payload from the formatted information to form an extracted frame.

6. The method of claim 1 wherein the first backhaul sub-network is designed to support communications traffic based on at least one of EVDO, LTE and WiMax technologies.

7. The method of claim 1 wherein the second backhaul sub-network is designed to support communications traffic based on the 1xRTT technology.

8. The method of claim 1 wherein the stream of terminated frames and the stream of modified, extracted frames are aggregated according to the priority of each point-to-point protocol multiplex frame.

9. The method of claim 1 wherein the logical link is comprised of the first and second sub-networks.

10. The method of claim 1 wherein the second network gateway receives the statistically aggregated stream of frames over the logical link, terminates a point-to-point multiplex frame format and restores the original formatting to each frame according to whether it is to be transmitted over the first sub-network or over the second sub-network of the network.

\* \* \* \* \*